United States Patent
Tawde

(10) Patent No.: US 7,747,083 B2
(45) Date of Patent: *Jun. 29, 2010

(54) SYSTEM AND METHOD FOR GOOD NEAREST NEIGHBOR CLUSTERING OF TEXT

(75) Inventor: Vivek B. Tawde, Van Nuys, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1129 days.

This patent is subject to a terminal disclaimer.

(21) Appl. No.: 11/390,001

(22) Filed: Mar. 27, 2006

(65) Prior Publication Data

US 2007/0244874 A1 Oct. 18, 2007

(51) Int. Cl.
*G06K 9/62* (2006.01)
(52) U.S. Cl. ...................................... 382/225
(58) Field of Classification Search ................ 382/209, 382/218, 224, 225, 305; 358/403; 707/1–10
See application file for complete search history.

(56) References Cited

U.S. PATENT DOCUMENTS

| | | | |
|---|---|---|---|
| 6,393,460 B1 * | 5/2002 | Gruen et al. ................ 709/204 |
| 6,697,998 B1 * | 2/2004 | Damerau et al. ............ 715/260 |
| 6,738,780 B2 * | 5/2004 | Bollacker et al. ........... 707/101 |
| 7,162,482 B1 * | 1/2007 | Dunning ..................... 707/102 |
| 2004/0064438 A1 * | 4/2004 | Kostoff ......................... 707/1 |
| 2005/0234879 A1 * | 10/2005 | Zeng et al. ...................... 707/3 |
| 2006/0122979 A1 * | 6/2006 | Kapur et al. ................... 707/3 |

* cited by examiner

*Primary Examiner*—Daniel G Mariam
(74) *Attorney, Agent, or Firm*—Hickman Palermo Truong & Becker LLP

(57) ABSTRACT

An improved system and method for clustering text or content described by text is provided. Each text in a set of texts may be represented as a dimensional vector of words. Singleton texts that may not be similar to another text may be excluded from the set of texts for clustering. Texts identified as good nearest neighbors may then be grouped in the same cluster. In addition, metadata describing content may be used for clustering items of aggregated content from content feeds. Metadata describing items of content from content feeds may be converted into a set of texts and texts identified as good nearest neighbors may then be clustered. Items of content feeds described by the clustered texts may then be similarly clustered. Any types of items of content that may be described by text may be clustered, including audio, images, video, multimedia content, and so forth.

10 Claims, 5 Drawing Sheets

SYSTEM AND METHOD FOR GOOD NEAREST NEIGHBOR CLUSTERING OF TEXT

CROSS-REFERENCE TO RELATED APPLICATIONS

The present invention is related to the following United States patent application, filed concurrently herewith and incorporated herein in its entirety:

"System and Method for Clustering Content Items From Content Feeds," U.S. patent application Ser. No. 11/389,999.

FIELD OF THE INVENTION

The invention relates generally to computer systems, and more particularly to an improved system and method for clustering text or content described by text.

BACKGROUND OF THE INVENTION

Online users may subscribe to content feeds for receiving a variety of daily information. Unfortunately, online content provided by content feeds may be organized by source and content items published may be duplicated by several content feeds. Such duplication of content items may occur more frequently for content feeds reporting headline news where it is customary for different news feeds to report about the same news story. However, other content feeds such as a music feed may likewise be organized by source and several music feeds may include duplication of content. Unwanted duplication of content items may, in general, occur for online content feeds providing information about any type of content, including text, images, audio, and video.

Moreover, the information provided by any of these types of content feeds may be stored offline for later access. Where there may be several content feeds providing information about overlapping content items, a user who wants to access particular content items may need to search through each content feed. What is needed is a way to more efficiently represent the information about content items provided by multiple content feeds. Such a system and method should work for any type of content including audio, image, and video. Moreover, it should work for offline as well as online presentation of information from content feeds.

SUMMARY OF THE INVENTION

Briefly, the present invention may provide a system and method for clustering text or content described by text. To do so, a clustering engine may be provided in an embodiment that may include an operably coupled text converter for converting text into a dimensioned vector, a singleton analyzer for identifying and removing text that is not similar to other texts, and a good nearest neighbor analyzer for identifying other texts which may be good nearest neighbors for a text. Any text or content described by text may be identified and grouped as a good nearest neighbor of other texts. In particular, each text in a set of texts to be clustered may be represented as a dimensional vector of words. A similarity matrix representing the cosine similarity between texts may be determined and an overlap matrix representing a measure of the same words shared by texts may be determined. One or more singleton texts that may not be similar to another text in the set of texts may be excluded from the set of texts for clustering. And texts identified as good nearest neighbors may then be grouped in the same cluster.

The present invention may support many applications where clustering of content described by text may provide an organization of the content by its description for presentation to a user. For example, instead of presenting content items organized by their source, content items of several content feeds may be grouped by a description of their content for presentation to a user. In an embodiment, a web page server may be provided which may be operably coupled to storage including content feeds. The web page server may include a content parser for parsing metadata of content feeds, a metadata converter for converting metadata to text, and a clustering engine for clustering texts identified as good nearest neighbors. To group content items of several content feeds, metadata describing items of content from content feeds may be converted into a set of texts. Text preprocessing may be performed and texts identified as good nearest neighbors may be clustered. The items of content feeds described by the texts may then be clustered according to the clustering of their respective texts. The web page server may then include the clustered items of aggregated content provided by the multiple content feeds in a web page for display as a single group.

Advantageously, the present invention may flexibly use metadata describing content to cluster items of aggregated content provided by multiple content feeds. Any types of items of content that may be described by text may be clustered, including text, audio, images, video, multimedia content, and so forth. Other advantages will become apparent from the following detailed description when taken in conjunction with the drawings, in which:

DETAILED DESCRIPTION

Exemplary Operating Environment

Figure 1:
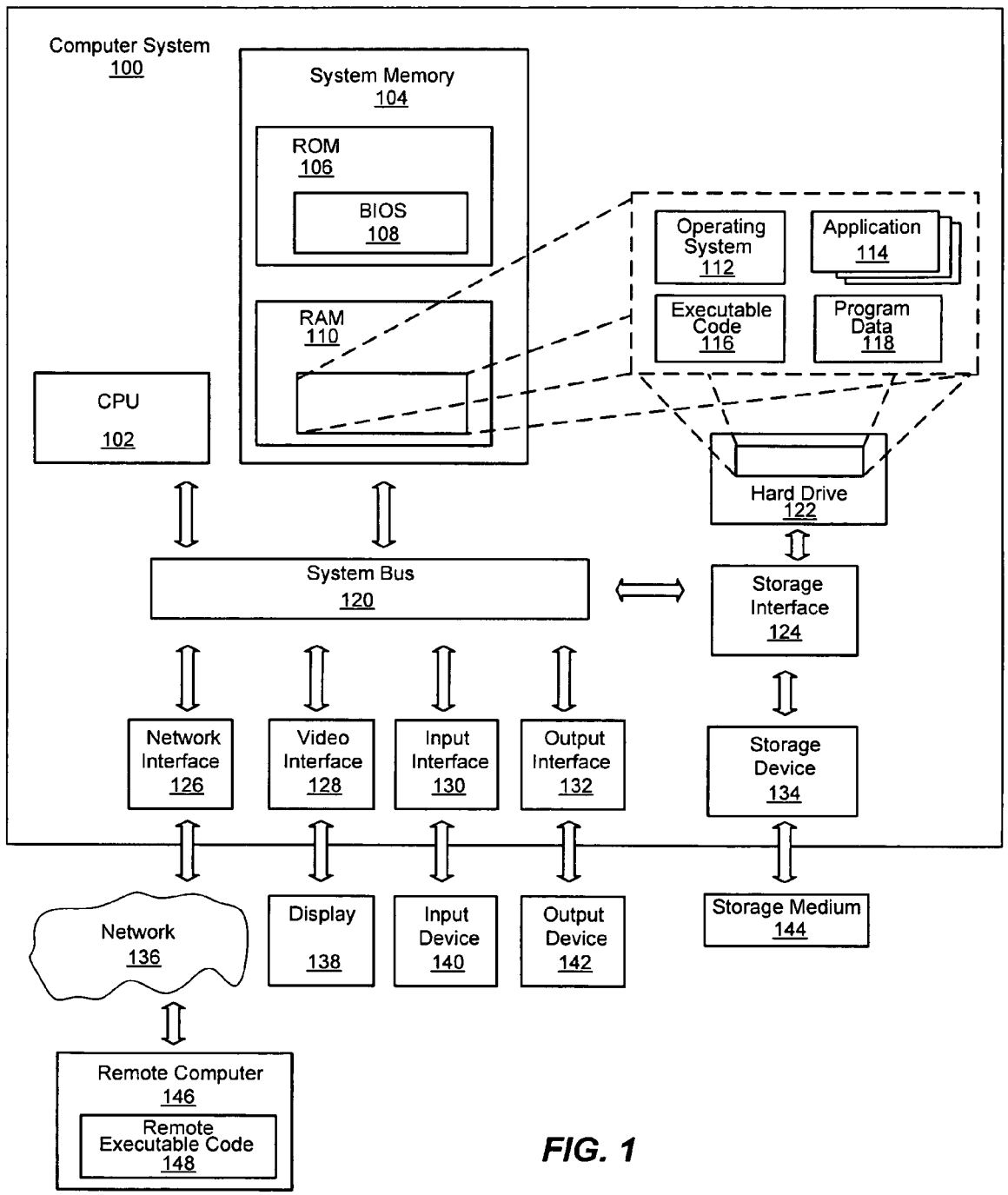
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may also embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, non-volatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used.

Good Nearest Neighbor Clustering of Text

The present invention is generally directed towards a system and method for clustering text or content described by text. More particularly, the present invention provides a generic framework for clustering content items that may be described by text. As used herein, text means information that may be represented by words. A content item means herein text or other content, including audio, video, and multimedia content. Any text or content described by text may be identified and grouped as a good nearest neighbor of other texts or content described by text.

As will be seen, the framework described may support many applications where clustering of content described by text may provide an organization of the content by its description for presentation to a user. For example, instead of presenting content items organized by their source, content items of several content feeds may be grouped in an embodiment by a description of their content for presentation to a user. As will be understood, the various block diagrams, flow charts and scenarios described herein are only examples, and there are many other scenarios to which the present invention will apply.

Figure 2:
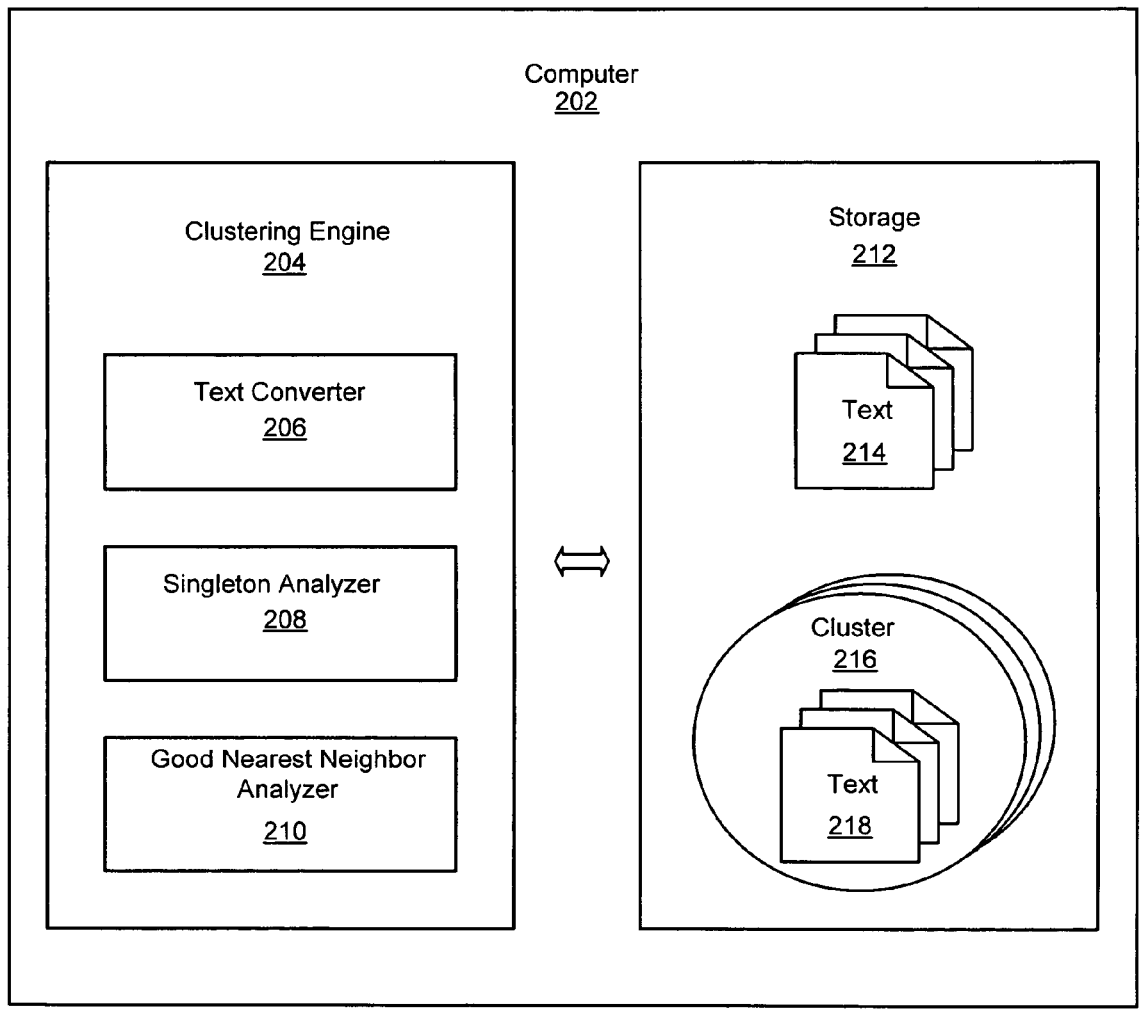
FIG. 2 is a block diagram generally representing an exemplary architecture of system components for clustering text, in accordance with an aspect of the present invention.

Turning to FIG. 2 of the drawings, there is shown a block diagram generally representing an exemplary architecture of system components for clustering text. Those skilled in the art will appreciate that the functionality implemented within the blocks illustrated in the diagram may be implemented as separate components or the functionality of several or all of the blocks may be implemented within a single component. For example, the functionality for the singleton analyzer 208 may be included in the same component as the good nearest neighbor analyzer 210. Or the functionality of the document converter 206 may be implemented as a separate component from the clustering engine 204.

In various embodiments, a computer 202, such as computer system 100 of FIG. 1, may include a clustering engine 204 operably coupled to storage 212. In general, the clustering engine 204 may be any type of executable software code such as a kernel component, an application program, a linked library, an object with methods, and so forth. The storage 212 may be any type of computer-readable media and may store texts 214 and clusters 216 of texts 218.

The clustering engine 204 may provide services for grouping texts 214 into clusters 216 of texts 218. A text may be any information that may be represented by words, including a document, a text field of a record or form, a dialog box of a user interface, and so forth. The clustering engine 204 may include a text converter 206 for converting each text into a dimensioned vector, a singleton analyzer for identifying and removing a text that is not similar to other texts, and a good nearest neighbor analyzer for identifying other texts which may be good nearest neighbors for a text. Each of these modules may also be any type of executable software code such as a kernel component, an application program, a linked library, an object with methods, or other type of executable software code. The clustering engine 204 may create clusters by including a text in the same cluster as its good nearest neighbors.

There are many applications which may use the present invention for clustering text or documents. For example, online applications that may access text or documents from multiple sources may present the text or documents organized by the similarity of their contents rather than by the source of their contents. Similarly, offline applications may use the present invention to organize text or documents on computer readable media. For any of these applications, new text or documents that may be accessed or stored may be incorporated in the organization by clustering them with the text or documents previously clustered.

Figure 3:
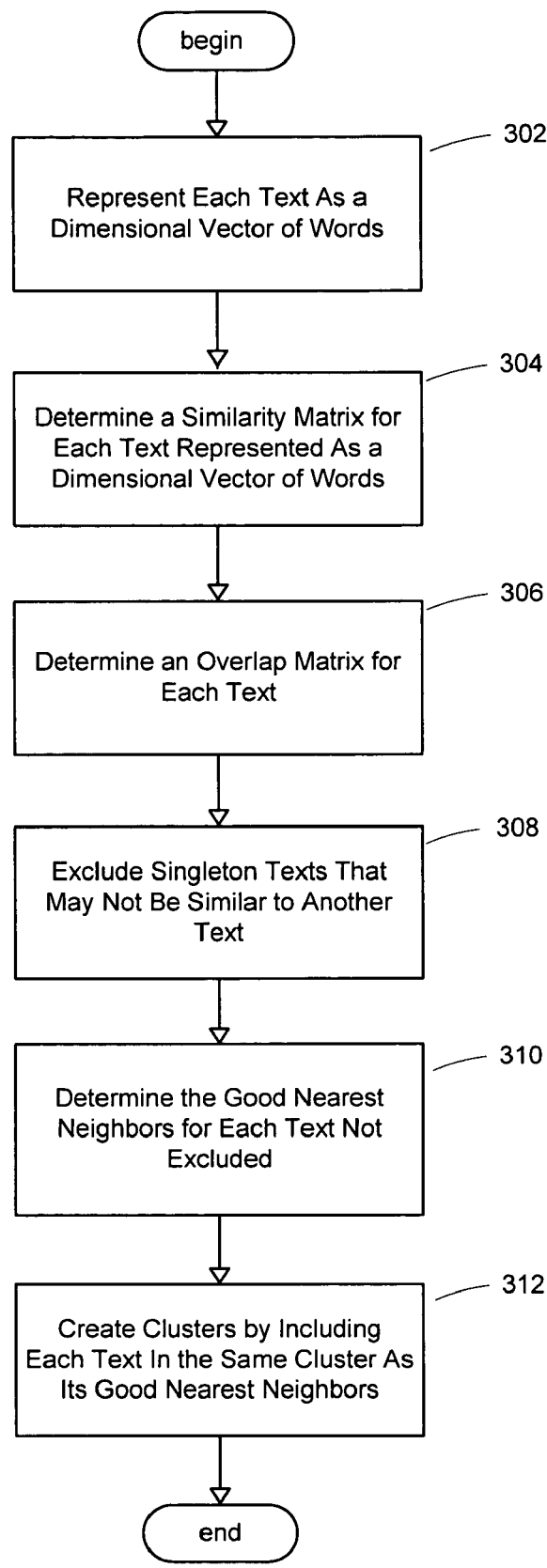
FIG. 3 is a flowchart generally representing the steps undertaken in one embodiment for clustering text, in accordance with an aspect of the present invention.

FIG. 3 presents a flowchart generally representing the steps undertaken in one embodiment for clustering text. At step 302, each text in a set of texts to be clustered may be represented as a dimensional vector of words. In an embodiment, each word of a document may form a dimension and, as is well known in the art, the weight on a dimension may be determined by the frequency of the word in the text and the importance of the word in the collection of texts.

Once each text may be represented as a dimensional vector of words, a similarity matrix may be determined at step 304 for each text represented as a dimensional vector of words. In an embodiment, a similarity matrix may be expressed as an n×n matrix, Sim (i,j), where each value indexed by (i,j) may be defined as the dot-product of the normalized dimensional vectors of texts i and j. This similarity matrix may represent the cosine similarity between texts i and j.

An overlap matrix may also be determined at step 306 for each text represented as a dimensional vector of words. In an embodiment, an overlap matrix may be expressed as an n×n matrix, Overlap (i,j), where each value indexed by (i,j) may be defined as the number of words shared by texts i and j. This overlap matrix may represent a measure of the same words shared by texts i and j.

After a similarity matrix and an overlap matrix may be determined, one or more singleton texts that may not be similar to another text in the set of texts may be excluded at step 308 from the set of texts for clustering. As used herein, a singleton text may mean a text that is determined not to be similar to another text in a set of texts. In an embodiment, a text i may be excluded as a singleton text if Sim (i,j) may be less than a lower similarity threshold for all j and Overlap (i,j) may also be less than an overlap threshold for all j. In various embodiments, the lower similarity threshold may be defined as 0.18 and the overlap threshold may be defined as 10. In particular, these thresholds may be used for excluding text describing content items in RSS feeds. In other embodiments for excluding content items from clustering, the thresholds may be different.

Once singleton texts may be excluded from the set of texts to be clustered, texts which may be identified as good nearest neighbors may be determined at step 310 for each text not excluded from the set of texts. As used herein, a good nearest neighbor of a text i, represented as a dimensional vector of words, may mean a text j, represented as a dimensional vector of words, if Sim (i,j) may be greater than an upper similarity threshold, or if both Sim (i,j) may be greater than a lower similarity threshold and Overlap (i,j) may also be greater than an overlap threshold. In an embodiment, a text i may be determined to be a good nearest neighbor of a text j if Sim (i,j) may be greater than an upper similarity threshold. In another embodiment, a text i may be determined to be a good nearest neighbor of a text j if both Sim (i,j) may be greater than a lower similarity threshold and Overlap (i,j) may also be greater than an overlap threshold. In yet another embodiment, a text i may be determined to be a good nearest neighbor of a text j if Sim (i,j) may be greater than an upper similarity threshold, or if both Sim (i,j) may be greater than a lower similarity threshold and Overlap (i,j) may also be greater than an overlap threshold. In various embodiments, the lower similarity threshold may be defined as 0.18, the upper similarity threshold may be defined as 0.4, and the lower overlap threshold may be defined as 3. In particular, these thresholds may be used for determining good nearest neighbors of content items in RSS feeds. In other embodiments for determining good nearest neighbors of content items, the thresholds may be different.

At step 312, clusters may be created by including each text in the same cluster as other texts determined to be its good nearest neighbors. In an embodiment using a modified version of Boruvka's Minimum Spanning Tree algorithm (See Algorithms in C++ by Robert Sedgewick, Section 20.5), each text may be included in the same cluster as its nearest neighbor where a nearest neighbor of text i may be a text j such that Sim (i,j) may be maximum for all j, except for j=i. When the texts not excluded from the set of texts may have been included in the same cluster as other texts determined to be its good nearest neighbors, processing may be finished for clustering texts.

Those skilled in the art will appreciate that clustering text by its content rather than its source may advantageously allow presenting the topics to a user organized by its content and that other presentation methods may likewise be supported by the generality of the framework provided, including presenting clusters of text from sub-groups of sources that has been organized by its contents.

Clustering of Content Items in Content Feeds

There may be many applications where clustering of content items described by text may provide an organization of the content by its description for presentation to a user. For instance, applications that may process images described by text, including photographic images, may use the present invention to provide an organization of the images by their description. Applications that may process audio content described by text, including music that may have descriptive material such as lyrics, may use the present invention to provide an organization of the audio content by their description. In particular, the system and method described above for good nearest neighbor clustering of text may also be used for clustering content items from multiple sources such as content items in several content feeds. As used herein, a content feed may mean metadata describing a content item and its location.

Figure 4:
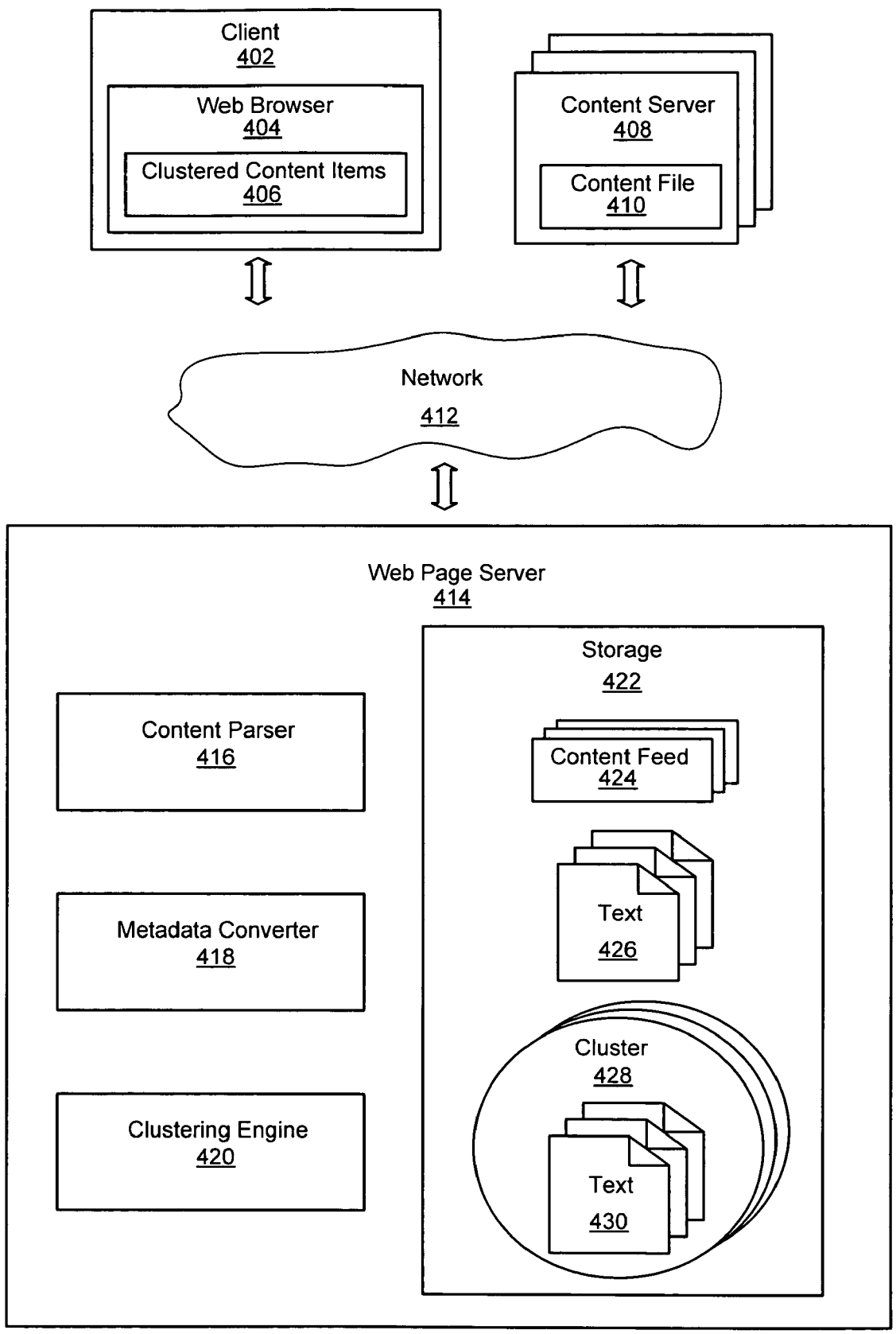
FIG. 4 is a block diagram generally representing an exemplary architecture of system components for clustering content items in content feeds, in accordance with an aspect of the present invention.

FIG. 4 presents a block diagram generally representing an exemplary architecture of system components for clustering content items in content feeds. Those skilled in the art will appreciate that the functionality implemented within the blocks illustrated in the diagram may be implemented as separate components or the functionality of several or all of the blocks may be implemented within a single component. For example, the functionality for the content converter 418 may be included in the same component as the content parser 416.

In various embodiments, a client computer 402 may be operably coupled to one or more web page servers 414 by a network 412. The client computer 402 may be a computer such as computer system 100 of FIG. 1. The network 412 may be any type of network such as a local area network (LAN), a wide area network (WAN) such as the Internet, or other type of network. An application such as a web browser 404 may execute on the client computer 402 and may include functionality for requesting content items such as news stories, music with accompanying lyrics, tagged images, and so forth. The web browser 404 may also subscribe to various content feeds including several news feeds. The present invention operable on a web page server 414 may support providing a web page with clustered content items 406 to the web browser 404 for display to a user.

A web page server 414 may be any type of computer system or computing device such as computer system 100 of FIG. 1. The web page server may provide services for providing web pages with various content as well as metadata for content feeds including as a description of the content and a link, such as a Uniform Resource Locator (URL), for locating the content described. A web page server 414 may also include a content parser 416 for parsing metadata of a content feed, a metadata converter 418 for converting metadata to text, and a clustering engine 418 for clustering text. Each of these modules may also be any type of executable software code such as a kernel component, an application program, a linked library, an object with methods, or other type of executable software code. Clustering engine 420 may be a clustering engine such as clustering engine 204 of FIG. 2 and may include a document converter 206 for converting each document into a dimensioned vector, a singleton analyzer for identifying and removing a document that is not similar to other documents, and a good nearest neighbor analyzer for identifying other documents which may be good nearest neighbors for a document.

A web page server 414 may include a storage 422 operably coupled to the content parser 416, the metadata converter 418, and the clustering engine 418. The storage 422 may be any type of computer-readable media and may store one or more content feeds 424, texts 426, and clusters 428 of texts 430. A content feed 424 may be a metadata file describing any type of content and a link to its location, such as a URL. For example, the content feed may be a Resource Description Format (RDF) Site Summary (RSS)file, a metadata file using a XML format commonly referred to as an RSS feed. The content feed may also be a metadata file for images using an XML format, a metadata file for audio using an XML format, a metadata file for video using an XML format, and so forth.

When a URL for a content feed 434 may be displayed by a web browser 404 and subsequently selected by a user, a request for a web page providing the content may be made to a content server 408. The content server 408 may be a web page server like web page server 414 and may be operably connected to network 412. The content server 408 may provide services for providing a content file 410 stored on the content server 408 or may provide a URL for locating the content requested on another web page server.

Because a web browser 404 may subscribe to multiple content feeds, particularly for the same type of content, the web page server 414 may cluster items of aggregated content provided by the multiple content feeds. Rather than displaying items of content by source, the items of the content feeds may be clustered and a cluster of items may be displayed as a single group.

Figure 5:
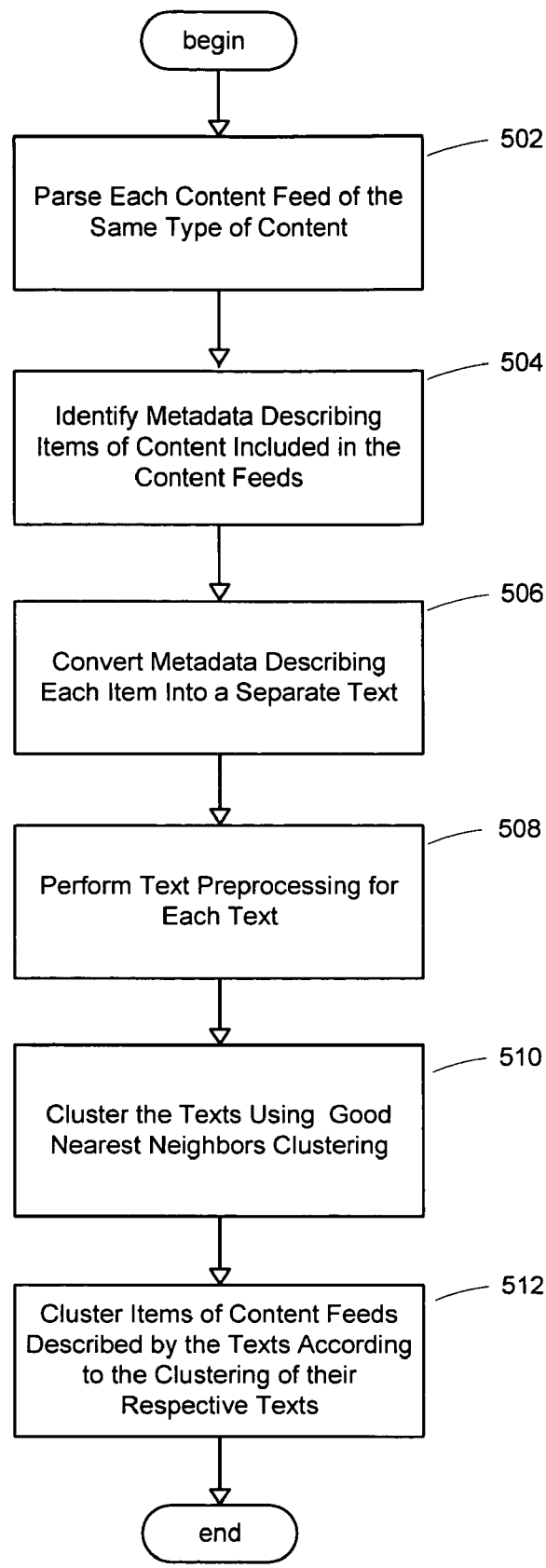
FIG. 5 is a flowchart generally representing the steps undertaken in one embodiment for clustering content items in content feeds, in accordance with an aspect of the present invention.

FIG. 5 presents a flowchart generally representing the steps undertaken in one embodiment for clustering content items in content feeds. At step 502, each content feed providing the same type of content may be parsed. In general, there may be multiple content feeds for which a client has subscribed. Some content feeds may, for instance, provide a particular type of content such as text, images, audio, video and so forth. In fact, there may be several feeds using the same format for the same type of content, such as several RSS feeds that may provide news stories. For each different type of content, there may be a specific XML format used for metadata describing the type of content. For example, several content feeds that may provide news stories may use an RSS format, a type of XML format. Other XML formats may be used for other types of content.

At step 504, metadata describing items of content in each content feed may be identified. The metadata may vary for each type of content and for each format used by a type of content feed. In the case of a RSS news feed, the metadata may include a title and description. In the case of a music feed, the metadata may include the title of a song and lyrics. A content parser, like content parser 416, may include parsing logic for each format used by a type of content feed available for subscription by a client.

At step 506, a text may be created from the metadata identified for each item in each content feed. In various embodiments, a part of the metadata identified for each item in a content feed may be used. In an embodiment where the metadata describing items of several RSS news feeds may be identified, a part of the metadata may be used such as a title and the first fifty words of the description. Similarly, in an embodiment where the metadata of several content feeds for music may be identified, a part of the metadata may be used such as a title of a song and the first fifty words of the lyrics, if available.

Then text preprocessing may be performed for each text at step 508. In an embodiment, stopwords may be removed from each text. For instance, stopwords may include function words such as articles, prepositions, conjunctions, pronouns, and so forth. In various embodiment, other text preprocessing may be performed such as stemming, removing inflectional endings, and so forth. After text preprocessing may be performed, the texts may be clustered at step 510 using the steps of FIG. 3 described above for good nearest neighbor clustering.

After clustering the texts using good nearest neighbor clustering, the items of content feeds described by the texts may then be clustered at step 512 according to the clustering of their respective texts. In an embodiment, the clustered items of content feeds may be included in a web page that may be sent to a web browser for display to a user. For example, clusters of news stories from several RSS news feeds may be presented on a web page organized by their content.

Thus the present invention may flexibly use metadata describing content to cluster items of aggregated content provided by multiple content feeds for display to a user. Advantageously, similar content items may be represented by a single cluster rather than appear duplicated by several sources such as multiple content feeds. Those skilled in the art will appreciate that content items from other sources that may be described by text may also be clustered using the framework described. Any type of content items described by metadata may be clustered such as audio, including music that may have descriptive material such as lyrics, video, including images that may have descriptive material such as tags, multimedia, including presentation that may have descriptive material, and so forth.

As can be seen from the foregoing detailed description, the present invention provides an improved system and method for clustering text or content described by text. Any text or content described by text may be identified and grouped as a good nearest neighbor of other texts or content described by text. Such a system and method may support many applications where clustering of content described by text may provide an organization of the content by its description for presentation to a user. As a result, the system and method provide significant advantages and benefits needed in contemporary computing, and more particularly in online applications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-implemented method for clustering text, comprising:
   representing at least one text in a set of texts as a dimensional vector of words;
   representing an other text in the set of texts as a dimensional vector of words;
   determining a dot-product of the dimensional vector of the other text and the dimensional vector of the at least one text;
   comparing the dot-product to a threshold, wherein the threshold comprises an upper bound of a value in a range from zero to one that represents a cosine similarity between the other text and the at least one text;
   if the dot-product exceeds the threshold, determining the at least one text to be the good nearest neighbor of the other text;
   clustering the other text in a cluster; and
   clustering the at least one text determined to be the good nearest neighbor of the other text in the cluster.

2. The method of claim 1 further comprising:
   comparing the dot-product to a similarity threshold;
   determining a measure of a number of words used both by the at least one text and the other text;
   comparing the measure of the number of words to an overlap threshold; and
   if the dot-product exceeds the similarity threshold and the measure of the number of words also exceeds the overlap threshold, determining the at least one text to be the good nearest neighbor of the other text.

3. The method of claim 2 wherein the similarity threshold comprises a lower bound of a value in a range from zero to one that represents a cosine similarity between the other text and the at least one text.

4. The method of claim 2 wherein the overlap threshold comprises a value in a range from zero to one that represents a measure of words used in common by the other text and the at least one text.

5. A computer-implemented method for clustering text, comprising:
   representing a text in a set of texts as a dimensional vector of words;
   representing each of one or more texts in the set of texts as a dimensional vector of words;
   for each of the one or more texts, determining a dot-product of the dimensional vector of the each of the one or more texts and the dimensional vector of the text;
   comparing the dot-product for each of the one or more texts to a similarity threshold;
   for each of the one or more texts, determining a measure of a number of words used both by the text and the each of the one or more texts;
   comparing the measure of the number of words for each of the one or more texts to an overlap threshold;
   if the similarity threshold exceeds the dot-product for each of the one or more texts and the overlap threshold exceeds the measure of the number of words for each of the one or more texts, determining the text not to be similar to the one or more texts in the set of texts;
   excluding the text determined not to be similar from clustering with the set of texts;
   determining at least one text of the one or more texts in the set of texts to be a good nearest neighbor of an other text of the one or more texts in the set of texts;
   clustering the other text in a cluster; and
   clustering the at least one text determined to be the good nearest neighbor of the other text in the cluster.

6. The method of claim 5 wherein the similarity threshold comprises a lower bound of a value in a range from zero to one that represents a cosine similarity between the text and the each of the one or more texts.

7. The method of claim 5 wherein the overlap threshold comprises a value in a range from zero to one that represents the measure of words used in common by the text and the each of the one or more texts.

8. The method of claim 5 further comprising determining a similarity matrix of values representing dot-products of normalized dimensional vectors of texts in the set of texts.

9. The method of claim 5 further comprising determining an overlap matrix of values representing measures of words used in common by texts in the set of texts.

10. A computer-readable storage medium having computer-executable instructions for performing the steps of:
representing at least one text in a set of texts as a dimensional vector of words;
representing an other text in the set of texts as a dimensional vector of words;
determining a dot-product of the dimensional vector of the other text and the dimensional vector of the at least one text;
comparing the dot-product to a threshold, wherein the threshold comprises an upper bound of a value in a range from zero to one that represents a cosine similarity between the other text and the at least one text;
if the dot-product exceeds the threshold, determining the at least one text to be the good nearest neighbor of the other text;
clustering the other text in a cluster; and
clustering the at least one text determined to be the good nearest neighbor of the other text in the cluster.

* * * * *